United States Patent [19]

Nagoshi et al.

[11] Patent Number: 5,359,355
[45] Date of Patent: Oct. 25, 1994

[54] INK JET RECORDING APPARATUS FOR RECORDING WITH VARIABLE SCANNING SPEEDS

[75] Inventors: Shigeyasu Nagoshi, Kawasaki; Hiromitsu Hirabayashi, Yokohama; Atsushi Arai, Kawasaki; Yuji Akiyama; Hitoshi Sugimoto, both of Yokohama; Miyuki Matsubara, Tokyo, all of Japan

[73] Assignee: Canon Kabushiki Kaisha, Tokyo, Japan

[21] Appl. No.: 894,998

[22] Filed: Jun. 8, 1992

[30] Foreign Application Priority Data

Jun. 14, 1991 [JP] Japan .................. 3-143282

[51] Int. Cl.$^5$ .................................. B41J 2/07
[52] U.S. Cl. ........................................ 347/9
[58] Field of Search ............ 346/75, 140 R, 1.1; 400/126

[56] References Cited

U.S. PATENT DOCUMENTS

| | | | |
|---|---|---|---|
| 4,216,480 | 8/1980 | Buehner et al. | 346/75 |
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,723,129 | 2/1988 | Endo et al. | 346/1.1 |
| 4,740,796 | 4/1988 | Endo et al. | 346/1.1 |
| 4,860,026 | 8/1989 | Matsumoto et al. | 346/1.1 |
| 4,963,882 | 10/1990 | Hickman | 346/1.1 |
| 5,155,503 | 10/1992 | Tasaki et al. | 346/140 R |

FOREIGN PATENT DOCUMENTS

| | | |
|---|---|---|
| 0013296 | 7/1980 | European Pat. Off. . |
| 0244604 | 11/1987 | European Pat. Off. . |
| 54-056847 | 5/1979 | Japan . |
| 58-069071 | 4/1983 | Japan . |
| 59-123670 | 7/1984 | Japan . |
| 59-138461 | 8/1984 | Japan . |
| 60-071260 | 4/1985 | Japan . |
| 61-095954 | 5/1986 | Japan . |

*Primary Examiner*—Benjamin R. Fuller
*Assistant Examiner*—N. Le
*Attorney, Agent, or Firm*—Fitzpatrick, Cella, Harper & Scinto

[57] ABSTRACT

A recording head having a plurality of recording elements can operate in a first recording mode for recording a desired image by performing a single scan operation on a predetermined region on a recording medium, and a second recording mode for recording a desired image by recording a thin image a plurality of number of times in a plurality of scan operations on the predetermined region. The scan speed in the second recording mode is set to be higher than that in the first recording mode. For example, when the scan speed in the second recording mode is N times that in the first recording mode, the driving operation of the plurality of recording elements is controlled to obtain a dot pattern in which the minimum dot distance in the scan direction in the second recording mode is N times or more that in the first recording mode. Image quality can be improved without decreasing the throughput.

19 Claims, 17 Drawing Sheets

● : 1ST PASS PRINT
○ : 2ND PASS PRINT
◉ : 3RD PASS PRINT
◎ : 4TH PASS PRINT

INK JET RECORDING APPARATUS FOR RECORDING WITH VARIABLE SCANNING SPEEDS

BACKGROUND OF THE INVENTION

1. Field of the Invention

The present invention relates to an ink jet recording apparatus.

2. Related Background Art

As recording apparatuses for expressing print information such as a character or an image by printing a group of dots, dot-matrix printers are known. Of these printers, an ink jet printer for ejecting ink jet droplets onto a recording medium has become increasingly popular due to its simple mechanism, low-noise or easy color expression feature, or the like.

FIG. 16 shows a print pattern. A print head 100 has an array of a plurality of nozzles NL to NH as ink ejection orifices. Ink droplets are ejected from these nozzles and land on a recording sheet. The print head 100 is moved in the X-direction in FIG. 16 while repeating the ejection operation (FIG. 16 also shows a landing state at that time). Upon completion of a print operation by a predetermined width, the recording sheet is fed, in turn, by a predetermined amount in the Y-direction in FIG. 16. In this manner, the recording operation progresses. FIG. 17 is a timing chart of a head driving operation for arbitrary dots N1 to N4 shown in FIG. 16. In this case, a 4-dot split driving method is employed, and is executed in the order of N1, N3, N2, and N4. The driving timings of the adjacent nozzles have an interval t1, as shown in FIG. 17. The interval t1 is a minimum value determined by a timing on a head driver or software, and it is impossible to drive the nozzles at a time interval shorter than t1. The print head 100 is scanned in the Y-direction while performing ejection operations of the nozzles at these timings, thus printing lines L1, L2, . . .

FIG. 18 shows a block driving method different from an N-dot split driving method. In this method, the above-mentioned nozzles N1 to N4 are simultaneously driven to perform a print operation. Blocks are respectively represented by B1 to B8 (in the case of a 32-nozzle head), and a minimum driving interval between the adjacent blocks is represented by t2. Time interval t2 is a value limited by the hardware or software configuration of the recording apparatus, and it is impossible to drive the blocks at a time interval shorter than t2.

The nozzle portions as ink ejection orifices suffer from a variation in ejection direction due to manufacturing errors. The variation in ejection direction appears as periodic nonuniformity in a print result since it is reproduced at a line feed pitch of the recording apparatus. When an ink is printed at a speed higher than an ink penetration speed in a recording medium, the printed ink overflows, resulting in blurring or color mixing.

As a method of preventing this phenomenon, a multi-pass print method based on a thinning operation is known. In the case of a 2-pass print mode as an example of the multi-pass print method, some dots, e.g., dots from odd-numbered nozzles are printed in the first-pass carriage scan operation, a line feed operation is performed by an amount ½ a normal amount, and dots from even-numbered nozzles are printed in the second-pass carriage scan operation.

However, according to the multi-pass print method, since the print operations are intermittently performed, the print time is prolonged considerably, and the throughput of the printer is decreased.

SUMMARY OF THE INVENTION

The present invention has been made in consideration of the above situation, and its object is to provide an improved ink jet recording apparatus.

It is another object of the present invention to provide an ink jet recording apparatus, which can improve image quality without decreasing the throughput.

It is still another object of the present invention to provide an ink jet recording apparatus, which can record an image free from blurring without decreasing the throughput regardless of the number of times of scan operations.

It is still another object of the present invention to provide an ink jet recording apparatus, which allows image recording in a first recording mode for performing image recording by a first number of times of scan operations on a predetermined region on a recording medium, and a second recording mode for performing image recording by a second number of times of scan operations larger than the first number of times of scan operations on the predetermined region, and has different scan speeds in the first and second recording modes.

It is still another object of the present invention to provide an ink jet recording apparatus, which can operate in a first recording mode for recording a desired image by performing a single scan operation on a predetermined region on a recording medium, and a second recording mode for recording a desired image by performing a plurality of number of times of scan operations on the predetermined region to record a thin image a plurality of number of times, and drives a recording head at a scan speed in the second recording mode N times that in the first recording mode so as to obtain a dot pattern in which the minimum dot distance in the scan direction in the second recording mode is N times that in the first recording mode.

The above and other objects of the present invention will become apparent from the following description taken in conjunction with the accompanying drawings.

DETAILED DESCRIPTION OF THE PREFERRED EMBODIMENTS

The preferred embodiments of the present invention will now be described in detail with reference to the accompanying drawings.

Figure 1:
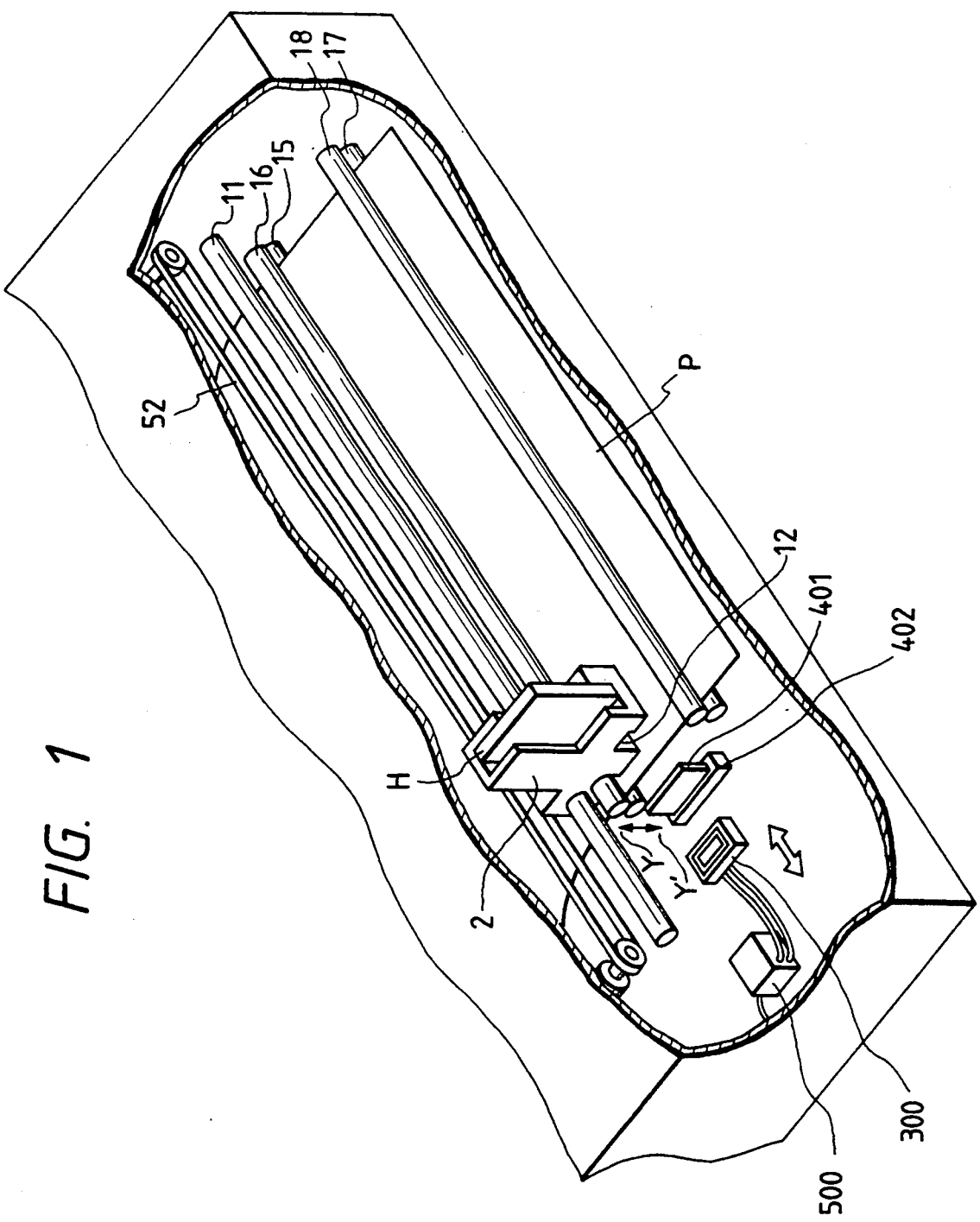
FIG. 1 is a partially cutaway perspective view of an ink jet recording apparatus which can adopt the present invention.

FIG. 1 is a schematic perspective view of an ink jet recording head that can adopt the present invention. A recording head unit H has a recording head 12 in its lower portion, and also has a connector for receiving signals for driving the recording head. The recording head 12 has a plurality of ejection orifices for ejecting ink droplets, and ejection energy generation elements (electrothermal converting elements) arranged in correspondence with the ejection orifices. The plurality of ejection orifices are aligned in a direction perpendicular to the scan direction of a carriage. When this recording head is used, recording can be performed at a recording density of 360 dpi. Note that an ink is supplied from an ink tank (not shown) to the recording head through, e.g., a pipe. A carriage unit 2 aligns and mounts the recording head unit H. The carriage unit 2 has a connector holder for transmitting signals for driving the recording head, and is electrically connected to the recording head. A scan rail 11 extends in the main scan direction of the carriage unit 2, and slidably supports the carriage unit 2. A driving belt 52 transmits a driving force for reciprocally moving the carriage unit 2. Convey roller pairs 15 and 16, and 17 and 18 are arranged before and after the recording position of the recording head, and are used for conveying a recording medium clamped therebetween. A recording medium P such as a paper sheet is urged against a platen (not shown) for regulating a recording surface of the recording medium P to be flat. At this time, the recording head of the recording head unit H mounted on the carriage unit 2 projects downward from the carriage unit, and is located between the recording medium convey rollers 16 and 18. The ejection orifice formation surface of the recording head opposes parallel to the recording medium P urged against the guide surface of the platen (not shown).

In the ink jet recording apparatus of the present invention, a recovery system unit is arranged at the home position side present at the left side in FIG. 1. The recovery system unit includes a cap unit 300 arranged in correspondence with the recording head unit H having the recording head. The cap unit 300 is slidable in the right-and-left direction in FIG. 1, and is movable in the up-and-down direction upon movement of the carriage unit 2. When the carriage unit 2 is located at the home position, the cap unit 300 joins the recording head to cap it, thereby preventing an ejection error caused by an increase in viscosity and sticking of an ink evaporated in the ejection orifices of the recording head.

The recovery system unit also includes a pump unit 500 communicating with the cap unit 300. When the recording head causes an ejection error, the pump unit 500 is used for generating a negative pressure for suction recovery processing executed by joining the cap unit 300 and the recording head.

The recovery system unit further includes a blade 401 as a wiping member formed of an elastic member such as rubber, and a blade holder 402 for holding the blade 401.

Figure 2:
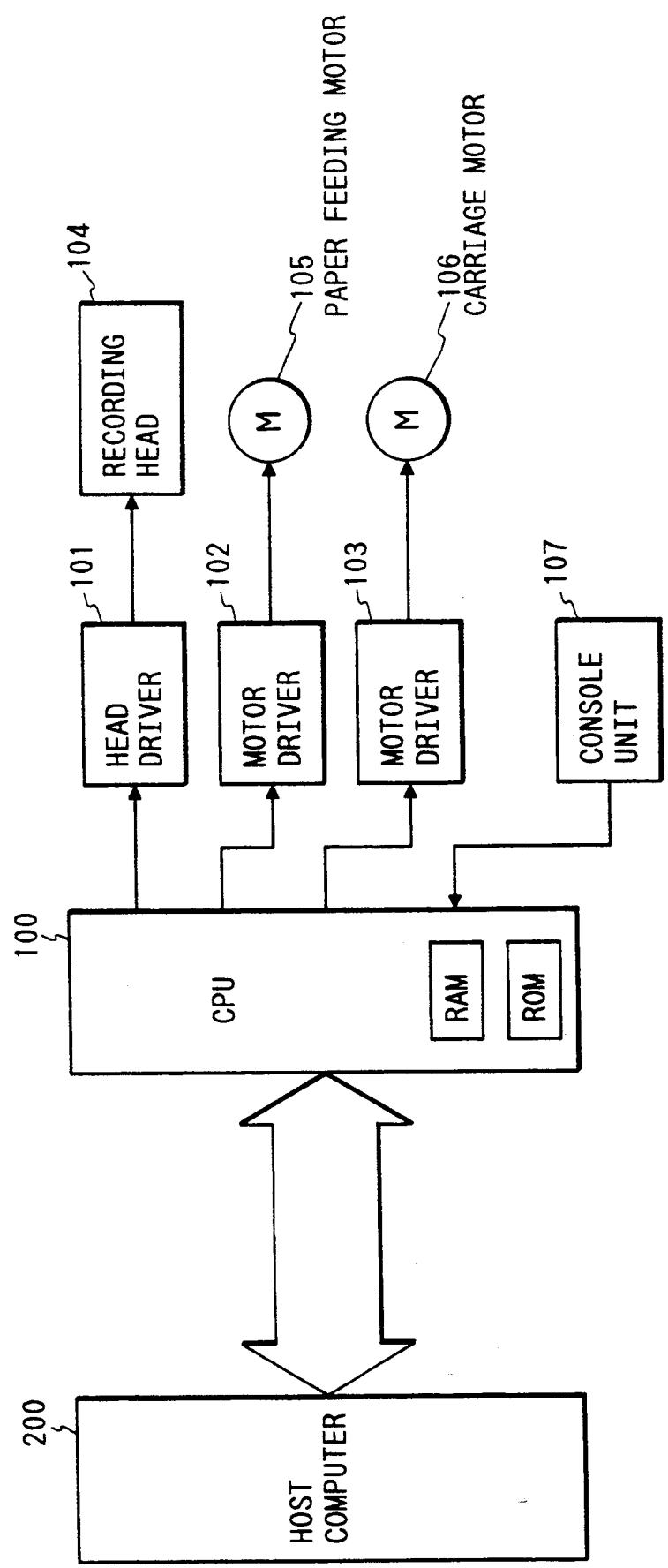
FIG. 2 is a block diagram showing a control unit of the ink jet recording apparatus shown in FIG. 1.

FIG. 2 is a block diagram showing a control unit of the ink jet recording apparatus shown in FIG. 1. The control unit is connected to a host computer 200 for transmitting print data and various control signals. The control unit includes a CPU 100 for performing communication control with the host computer 200, sequence control of the apparatus, and the like. The CPU 100 is mainly constituted by a known one-chip microcomputer incorporating a ROM, RAM, and the like. The control unit also includes a head driver 101 for driving the ejection energy generation elements of a recording head 104 (corresponding to 12 in FIG. 1), a motor driver 102 for driving a paper feeding motor 105, a motor driver 103 for driving a carriage motor 106, and a console unit 107 having a manual switch for selecting one of a single-pass print mode and a multi-pass print mode (to be described later). The CPU 100 controls the driving operation of the carriage motor 106 so that the single- and multi-pass print modes have different scan speeds.

When the CPU 100 receives data from the host computer 200, it drives the carriage motor 106 to cause the carriage unit 2 to travel, thereby starting the main scan operation. At the same time, the CPU 100 drives the electrothermal converting elements as the ejection energy generation elements of the recording head 104 according to recording data, thereby performing a print operation for one line. Upon completion of the print operation for one line, the CPU 100 drives the paper feeding motor 105 to feed the recording medium P by a predetermined amount, and then starts the next print operation. Upon completion of the recording operation for one page, the CPU exhausts the recorded recording medium P outside the apparatus, and then waits for the next print command.

The apparatus of this embodiment can perform a print operation in the single-pass print mode for performing a print operation by scanning a given region on the recording medium once, and the so-called multi-pass print mode for recording a thin image a plurality of number of times by scanning the given region on the recording medium a plurality of number of times so as to obtain a desired image, according to a selective input from the console unit 107. As will be described later, the single- and multi-pass print modes have different scan speeds. The print method in the multi-pass print mode of this embodiment will be described below.

First Embodiment

Figure 3:
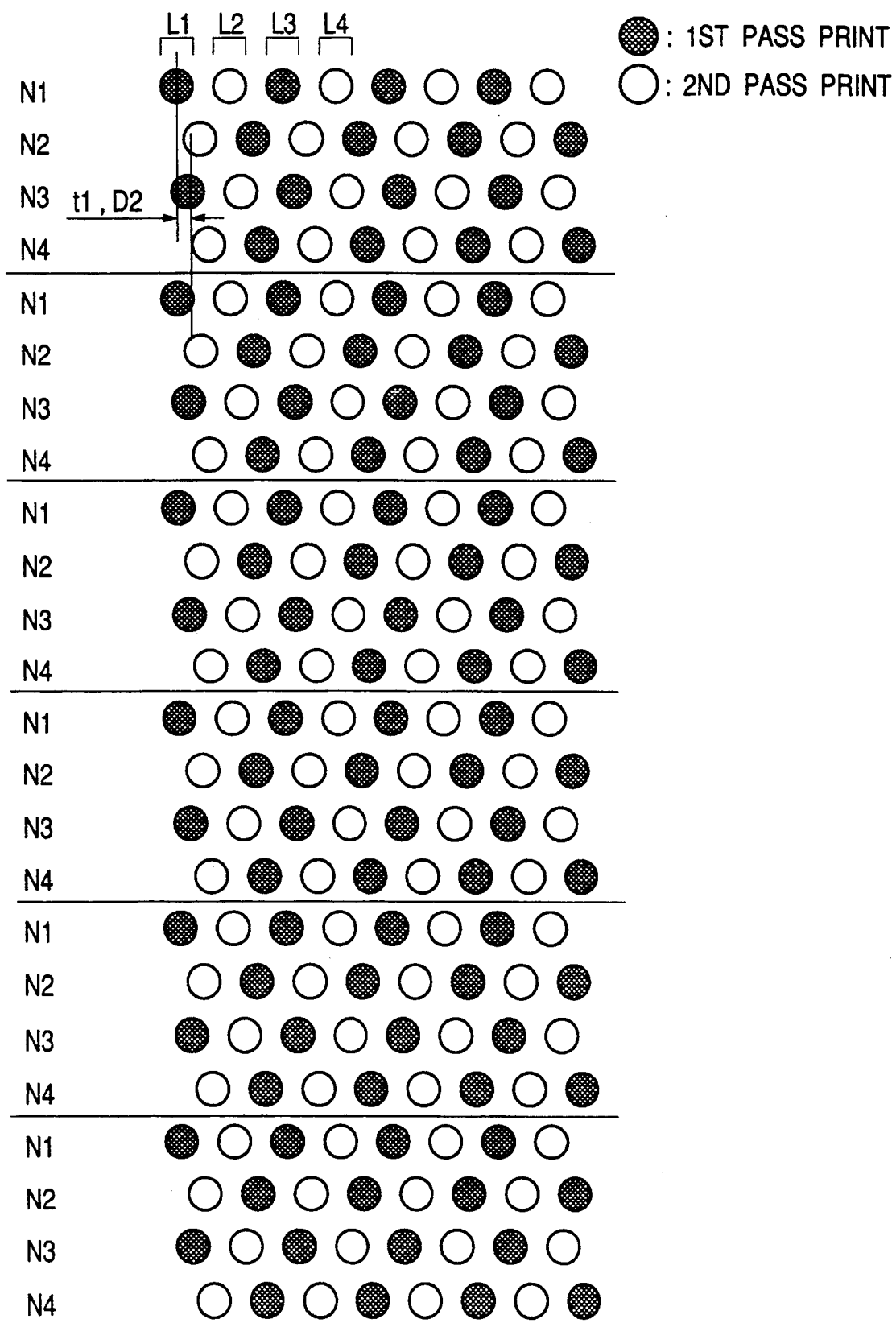
FIG. 3 is a view showing thinning driving patterns according to the first embodiment.
Figure 17:
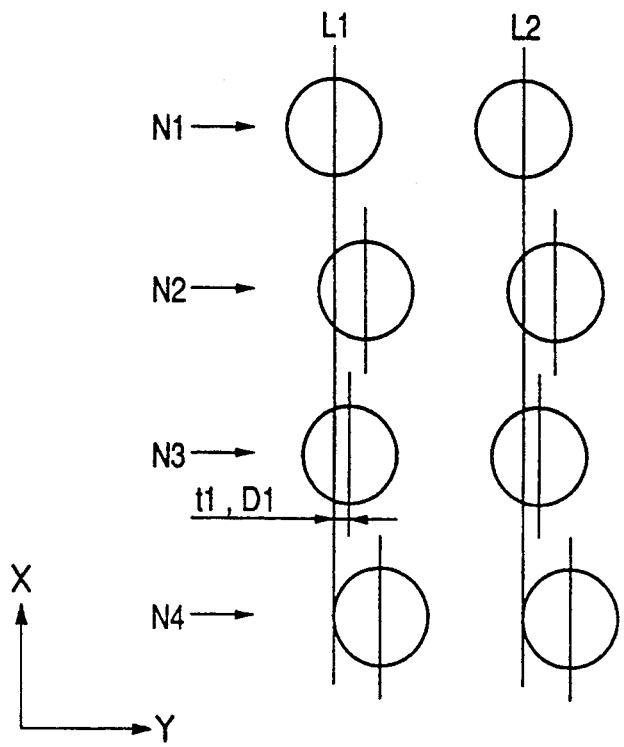
FIG. 17 is a view showing a conventional print head driving pattern.

FIG. 3 shows the first embodiment. In this embodiment, the recording head has 24 nozzles, and is driven in units of blocks each including four nozzles. A 2-pass ×2-speed print operation in a 4-dot split driving mode will be explained below. FIG. 3 shows a thinning pattern and a driving order. In FIG. 3, crosshatched dots are those printed in the first-pass carriage scan operation, and blank dots are those printed in the second-pass carriage scan operation. In the first-pass carriage scan operation, nozzles N1 to N4 in each block are driven in the order of N1, N3, N2, and N4 to print lines L1 and L2. The same applies to the print operations of a line L3 and subsequent lines. In the second-pass carriage scan operation, the nozzles are driven in the order of N2, N4, N1, and N3 to print the lines L1 and L2. The same applies to the print operations of the line L3 and subsequent lines. Note that L1, L2, ... represent lines of dots like in FIG. 17, and t1 in FIG. 3 also represents the minimum head driving timing interval like in FIG. 17.

In this embodiment, since the 2-pass print mode is executed, the carriage is scanned at a carriage speed twice that in the 1-pass print mode. More specifically, as for the dot distance, a dot distance D2 in FIG. 3 is twice a dot distance D1 in FIG. 17. Since the minimum driving timing interval (t1) between adjacent dots is the same as that in FIG. 17, the print operation can be performed at the same print density as that in FIG. 17 when the thin/driving pattern shown in FIG. 3 is used in the 2-pass ×2-speed print operation.

Figure 4:
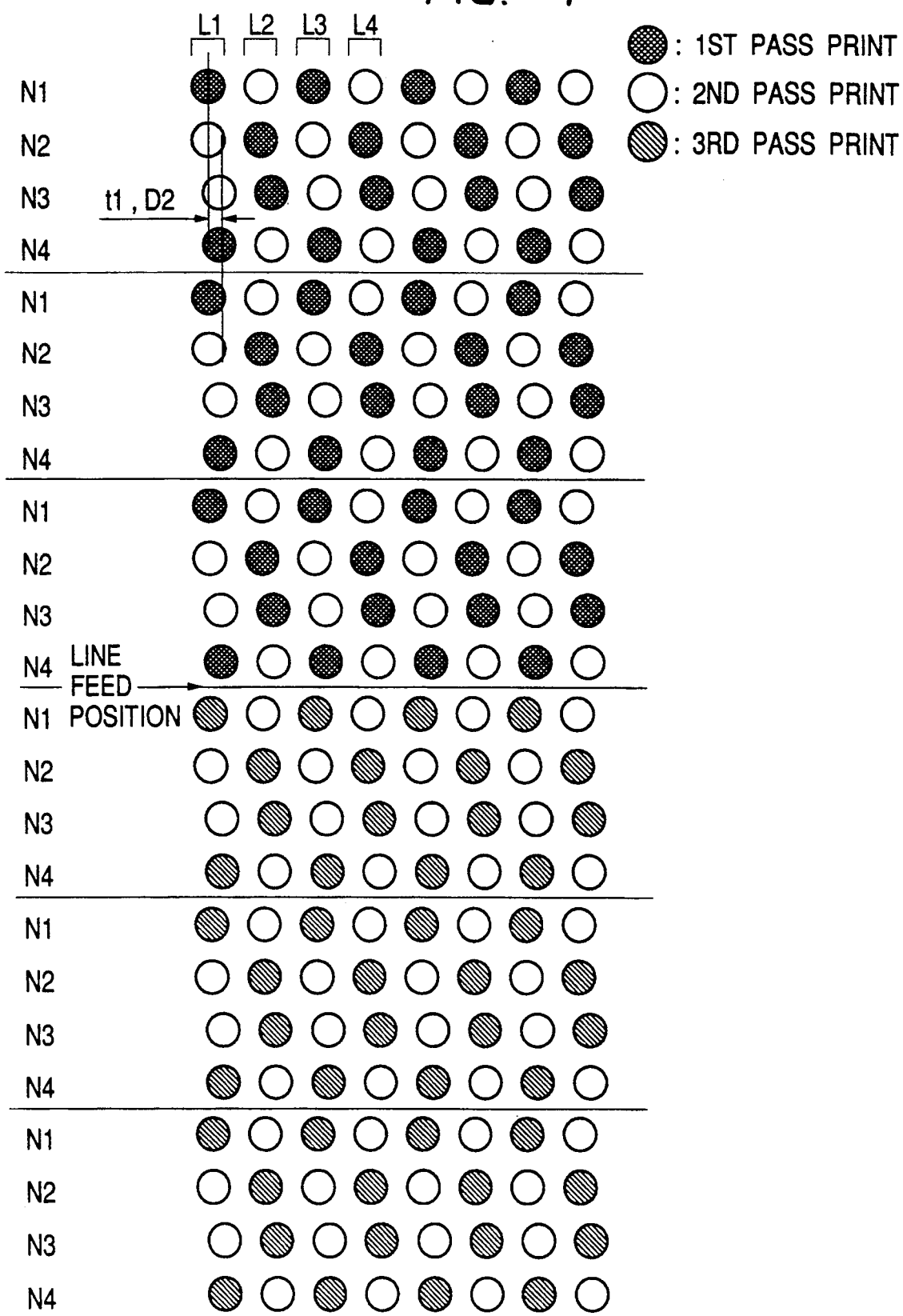
FIG. 4 is a view showing a thinning driving/line feed pattern according to the second embodiment.

When a dot arrangement is as shown in FIG. 4, the driving order need only be set to be able to perform a print operation at the minimum driving timing interval t1, thus allowing the 2-pass ×2-speed print operation. For example, if the print order of the first pass is N1, N4, N3, and N2, and the print order of the second pass is N3, N2, N1, and N4, the print operation can be performed in the same manner as in the above-mentioned case. In addition, the driving operation may be performed while exchanging the first and second passes. More specifically, in the case of an N-pass ×N-speed print operation, the driving operation need only be performed, so that the dot interval (two dots/pass in this embodiment) in one block of each pass is set to be N times the dot distance D1 in the 1-pass print mode. However, since a print line (lines L1, L2, ... .) requires one dot in association with the print density of the recording apparatus, a dot distance exceeding one dot is not permitted.

As described above, when the print pattern and thinning pattern are determined so that the minimum driving timing interval is set to be t1 or more, the carriage speed can be doubled and the same print density as that in the 1-pass print mode can be assured in the two-pass print mode. Thus, a decrease in print speed can be prevented without decreasing the image density.

Second Embodiment

FIG. 4 shows a dot driving pattern of the second embodiment. This embodiment exemplifies a thinning pattern used when a line feed operation is performed by a width half a normal line feed width. FIG. 4 shows a case wherein a head having 24 nozzles is subjected to a 2-split line feed operation (a line feed operation at a 12-nozzle pitch). Crosshatched dots are those printed in the first pass. In this case, nozzles are driven in the order of N1, N4, N2, and N3 in each block. Similarly, blank dots are those printed in the second pass. In this case, the nozzles are driven in the order of N2, N3, N1, and N4. Hatched dots are those printed in the third pass, and the nozzles are driven in the order of N1, N4, N2, and N3. A line feed operation is performed by a width corresponding to 12 nozzles between adjacent carriage scan operations (passes) (FIG. 4 shows the line feed position). FIG. 4 illustrates dots corresponding to only 12 nozzles printed in the first and third passes since it partially shows a 2-split line feed pattern. However, in practice, dots corresponding to 24 nozzles are printed in each pass excluding first and last passes of the print operation (in the first and last passes of the print operations, only upper and lower 12 nozzles are subjected to the print operation). In this embodiment, the print operation can be performed at a doubled carriage scan speed while the minimum driving timing interval t1 and the dot distance D2 remain the same like in the first embodiment.

The characteristic feature of this embodiment is that since the first dot (N1) of the first pass and the first dot (N2) of the second pass have the same print start position (X-direction), a shift of a dot array can be eliminated as compared to the first embodiment. In the first embodiment, the largest dot interval (X-direction) in one block is 3*D2 between N1 and N4. However, in this embodiment, the maximum dot interval is only D2.

Figure 5:
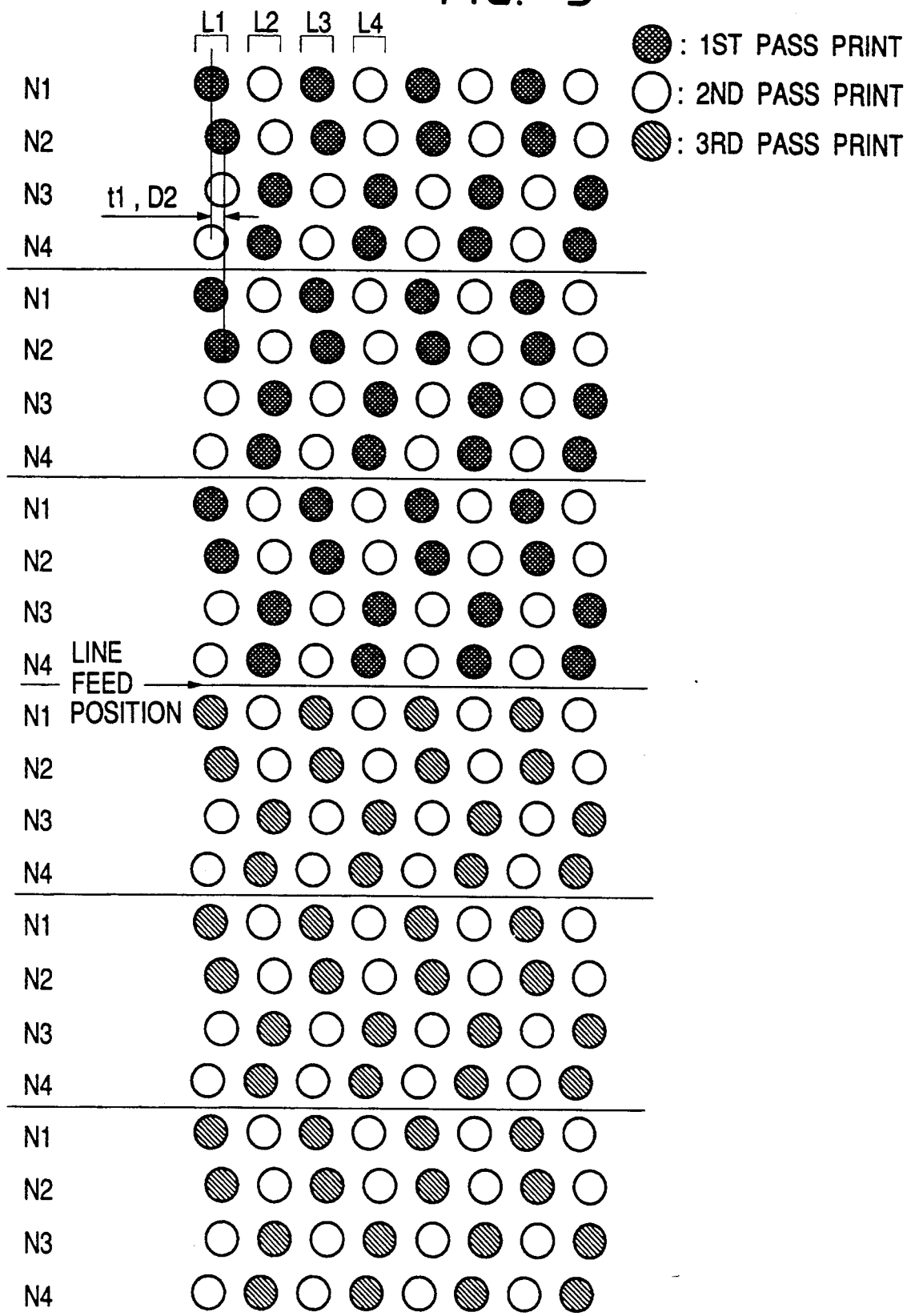
FIG. 5 is a view showing another pattern of the second embodiment.

FIG. 5 shows another driving pattern. In this case, the 2-split line feed print mode is exemplified like in the above embodiment. The nozzles are driven in the order of N1, N2, N4, and N3 in the first pass, and are driven in the order of N4, N3, N1, and N2 in the second pass. A shift of a dot array can be eliminated like in the embodiment shown in FIG. 4.

Third Embodiment

Figure 6:
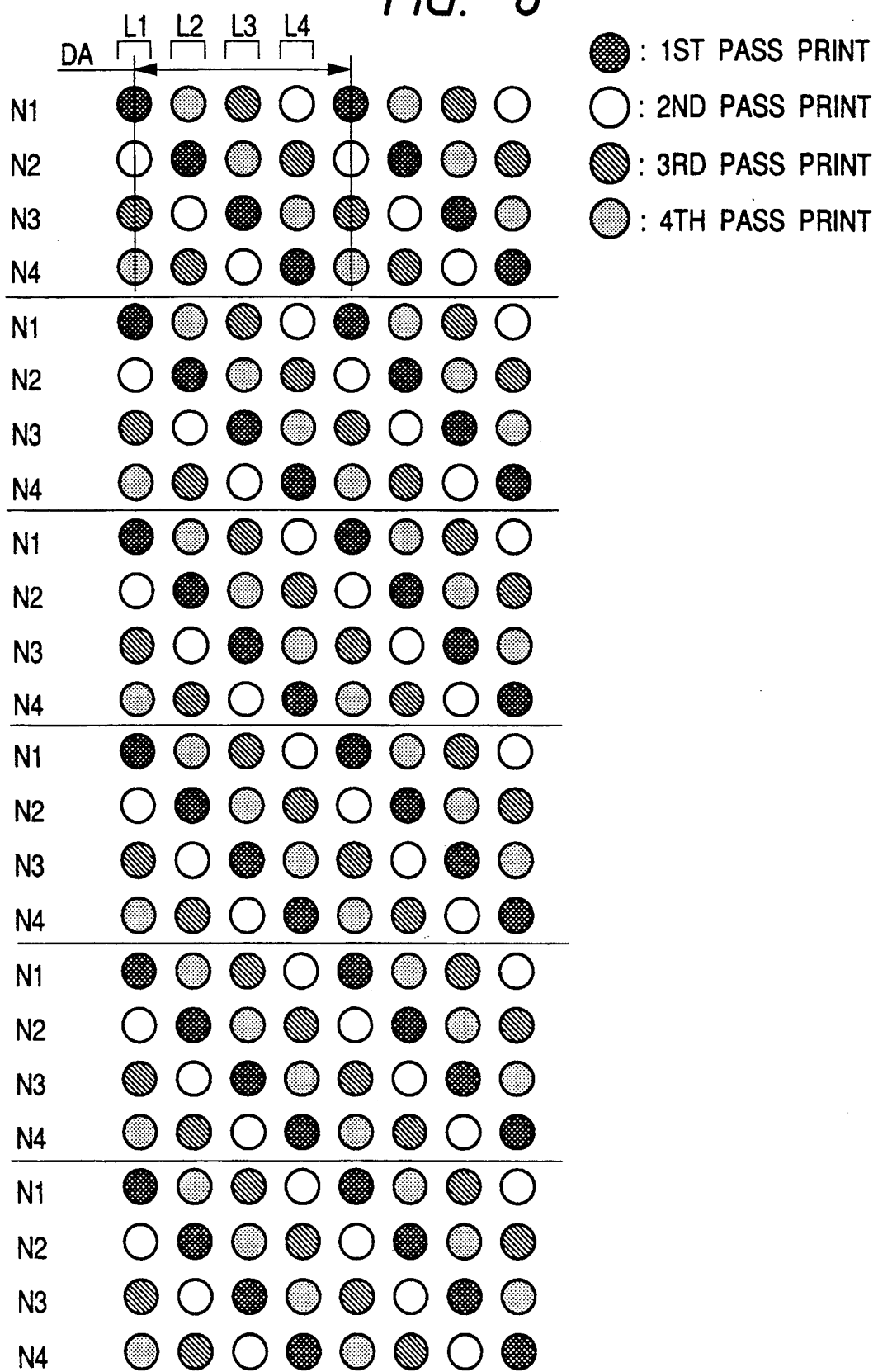
FIG. 6 is a view showing a thinning driving pattern in a block driving mode according to the third embodiment.

FIG. 6 shows a dot driving pattern of the third embodiment. In this embodiment, in the first pass, nozzles are driven in the order of N1, N2, N3, and N4 in each block to print one line. In the second pass, the nozzles are driven in the order of N2, N3, N4, and N1 to print one line. In the third pass, the nozzles are driven in the order of N3, N4, N1, and N2 to print one line. In the fourth pass, the nozzles are driven in the order of N4, N1, N2, and N3 to print one line. Thus, the print operation is executed in the pattern shown in FIG. 6. In this embodiment, since the same driving start timing can be set for the passes, the dot arrays are aligned on matrix points, as shown in FIG. 6. Thus, an image free from distortion can be obtained, and the throughput can be improved. When dots are arranged so that the continuous driving speed at the same dot position is four times that in a normal print mode, a 4-pass ×4-speed driving operation can be realized as a carriage driving operation.

Fourth Embodiment

Figure 7:
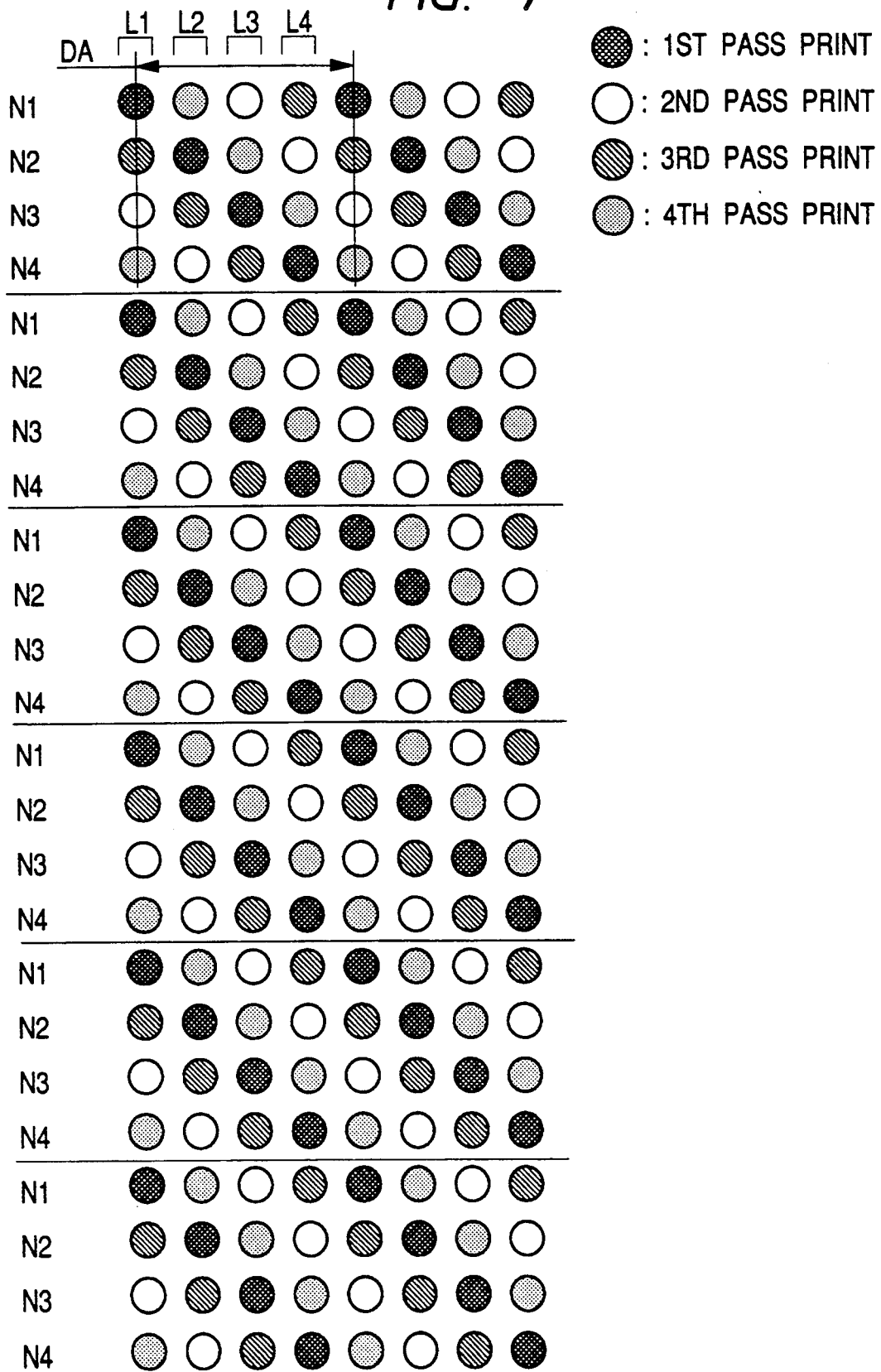
FIG. 7 is a view showing a thinning driving pattern in a block driving mode according to the fourth embodiment.

FIG. 7 shows the fourth embodiment. In this embodiment, the distortion preventing performance of the third embodiment is improved. In the third embodiment, since dots are printed to be adjacent to each other in adjacent passes in the vertical direction (Y-direction), an ink may be blurred. Thus, in this embodiment, nozzles are driven in the order of N1, N2, N3, and N4 in each block in the first pass. In the second pass, the nozzles are driven in the order of N3, N4, N1, and N2. In the third pass, the nozzles are driven in the order of N2, N3, N4, and N1. In the fourth pass, the nozzles are driven in the order of N4, N1, N2, and N3. Thus, the print operation is performed in the pattern shown in FIG. 7. More specifically, the print interval between the first and second passes is set to be one dot in the Y-direction. In this interval, dots in the third pass are printed. When the ink penetrates and is fixed at this pass interval, if dots in the next pass are printed, the ink can be prevented from being blurred at least in the Y-direction.

Fifth Embodiment

Figure 8:
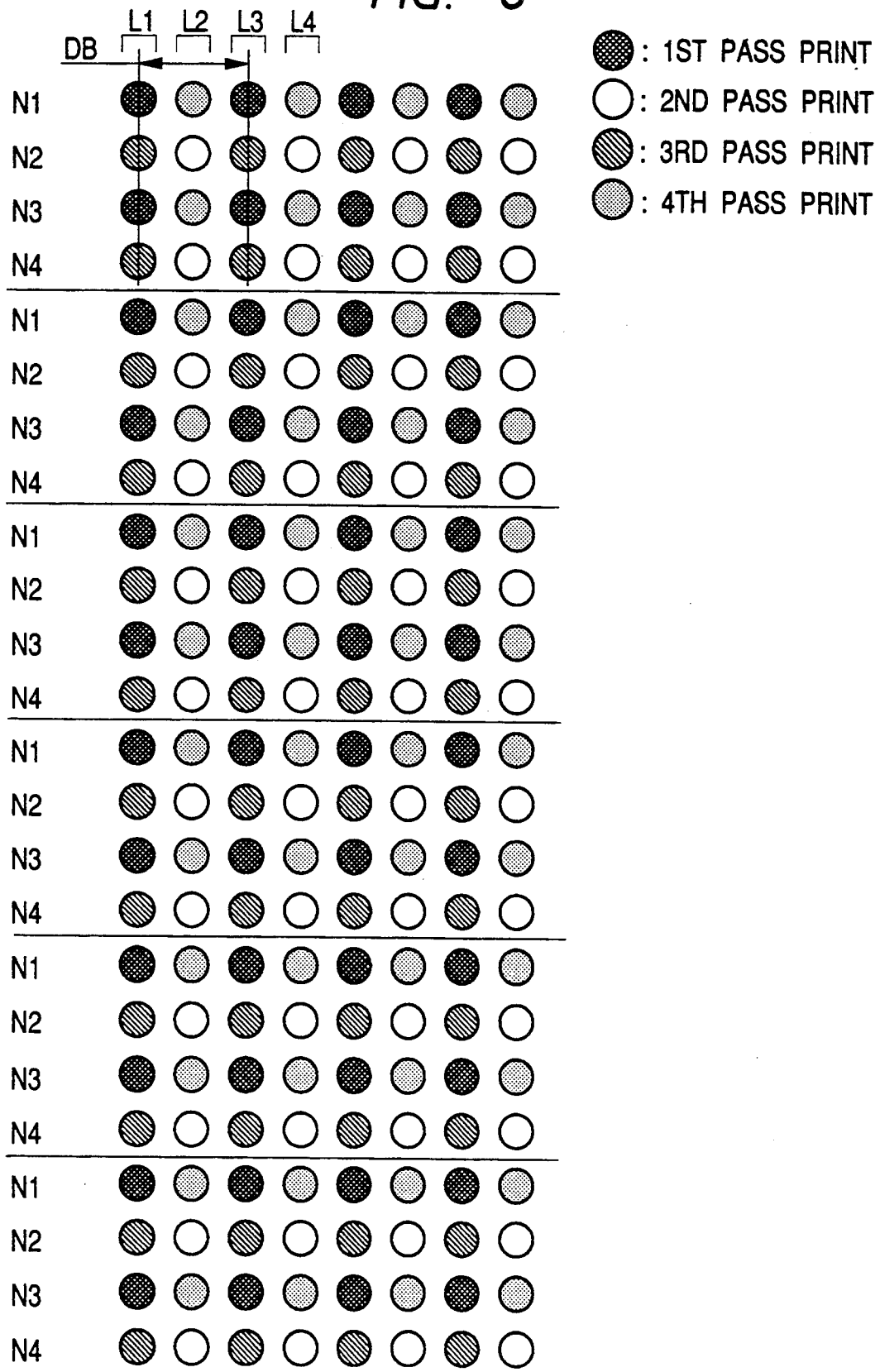
FIG. 8 is a view showing a thinning driving/line feed pattern according to the fifth embodiment.

In the embodiment shown in FIG. 8, the ink blurring prevention effect can be improved as compared to the fourth embodiment. This embodiment pays attention to dot blurring not only in the vertical direction (Y-direction) but also in an oblique direction. More specifically, in this embodiment, nozzles N1 and N3 in each block are simultaneously driven to print an odd-numbered line in the first pass. In the second pass, nozzles N2 and N4 are simultaneously driven to print an even-numbered line. In the third pass, the nozzles N2 and N4 are simultaneously driven to print the odd-numbered line. In the fourth pass, the nozzles N1 and N3 are simultaneously driven to print the even-numbered line. Thus, since the dot interval in one pass is separated by two dots (DB in FIG. 8), dot blurring in each pass and between adjacent passes can be prevented. In this embodiment, since the driving interval of the same nozzle is half that in the third embodiment, a 4-pass ×2-speed print operation is performed.

Sixth Embodiment

Figure 9:
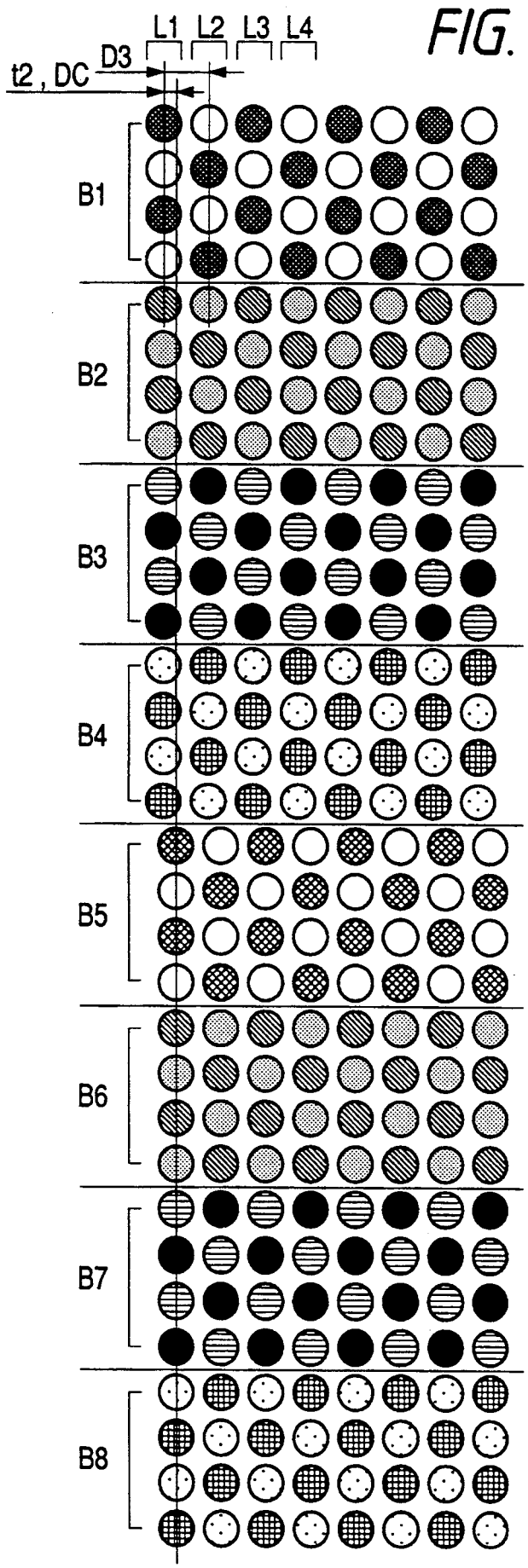
FIG. 9 is a view showing a thinning driving/line feed pattern according to the sixth embodiment.
Figure 18:
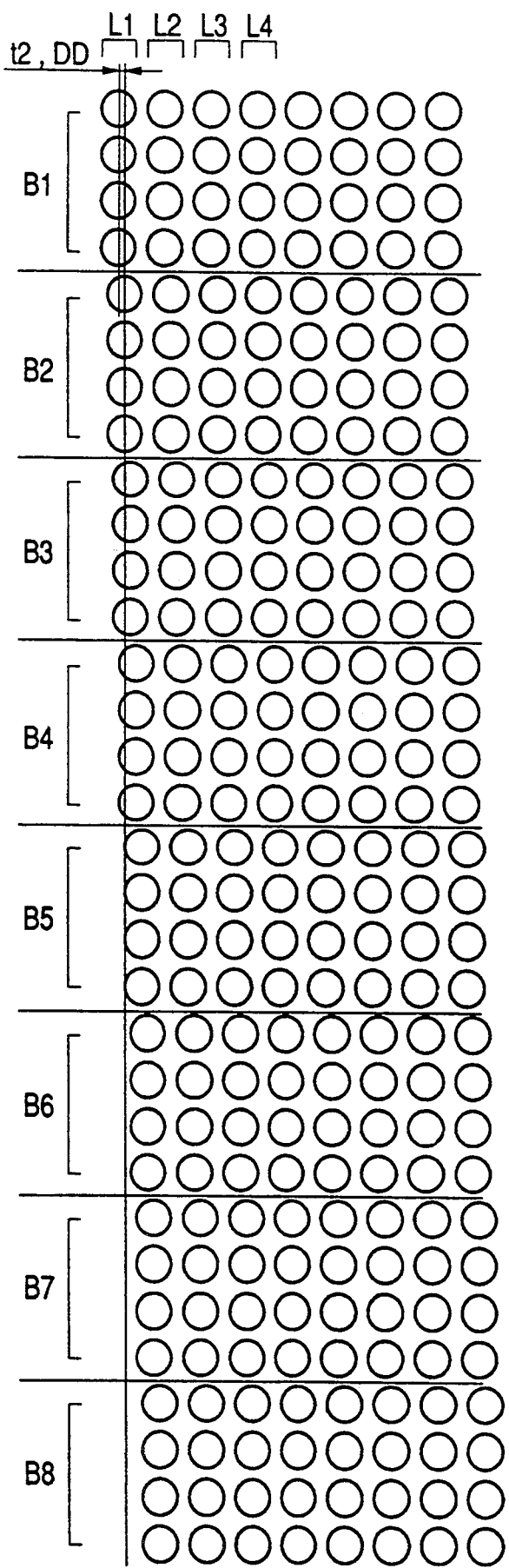
FIG. 18 is a view showing dot arrays in a conventional block driving mode.

FIG. 9 shows a dot driving pattern of the sixth embodiment. This embodiment exemplifies an ink ejection method for simultaneously driving nozzles in units of blocks unlike in the above-mentioned 4-dot split driving method (4 dots/block). In this embodiment, a recording head has 32 nozzles. The 32 nozzles are divided into eight blocks (4 dots/block), and are driven in units of blocks. As for the carriage scan operation, an 8-pass ×2-speed print operation is performed. In FIG. 9, a dot interval DC is twice a dot interval DD shown in FIG. 18. Since the minimum driving timing interval t2 is the same as t2 in FIG. 18, print lines are scanned and printed at a speed twice that in FIG. 18.

Figure 10:
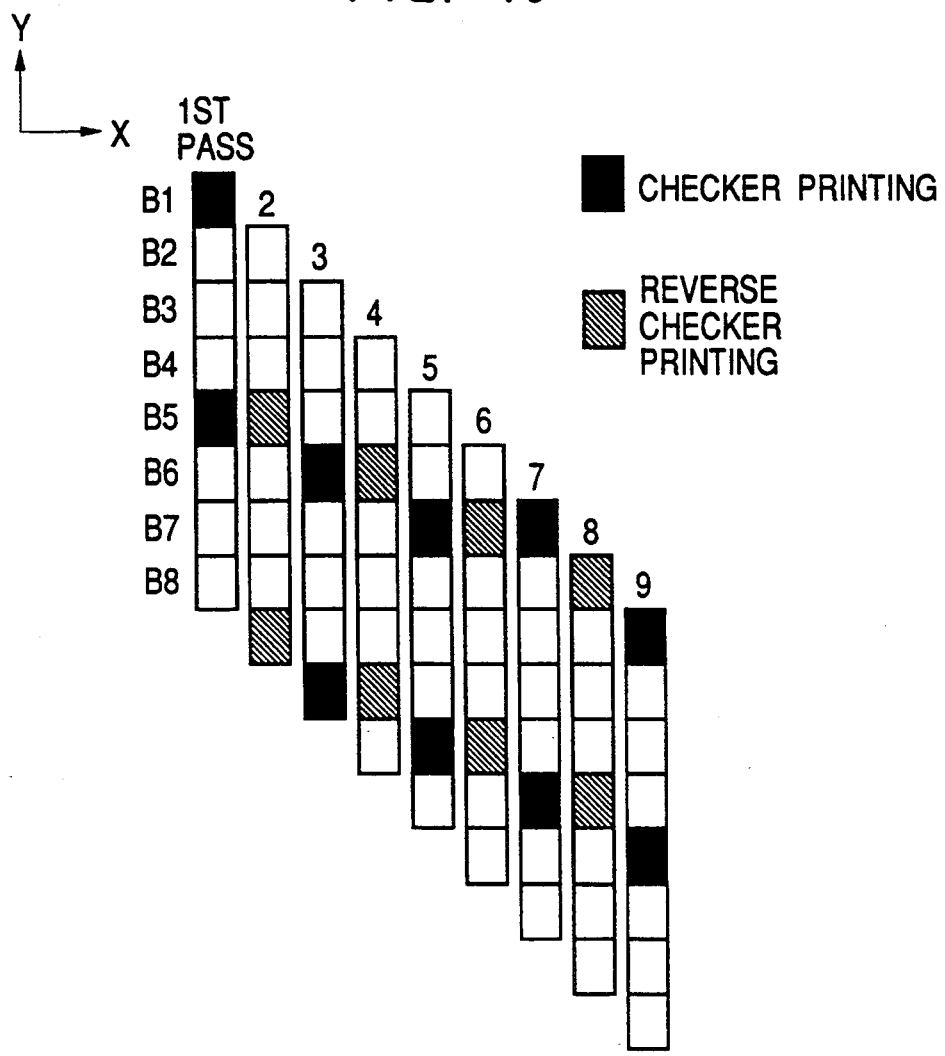
FIG. 10 is a view showing in detail a print/line feed state of the sixth embodiment.

FIG. 10 is a schematic view showing a driving method when each block of this embodiment is represented by one box, and checker and reverse checker thinning patterns are employed. In the first pass, blocks B1 and B5 are printed, and a recording medium is fed by four nozzles in the Y-direction. In the second pass, blocks B4 and B8 are printed in a reverse checker pattern reverse to that in the first pass. Thereafter, when the driving operations of the blocks and the feed operation of the recording medium by four nozzles are performed, as shown in FIG. 10, dots in a single region are printed using different blocks. Thus, the print operations of a region corresponding to a 32-nozzle width are completed in a total of eight passes. In an actual print state, upper and lower half nozzles (in this embodiment, 16 nozzles each) are respectively vertically aligned in line, as shown in FIG. 9.

In the case of the block driving method, when the driving pattern and the thinning patterns, which satisfy the minimum driving timing, are used, the print operation can be performed at a doubled carriage speed. The driving timing interval of this embodiment may be set to be t2 or more unless the print line interval D3 is not exceeded (if the driving timing interval is larger than t2, the carriage scan speed is decreased). As the thinning patterns of this embodiment, checker and reverse checker patterns are used. However, this embodiment is not limited to these patterns as long as patterns allow print operations without dot omissions in two carriage scan operations.

Seventh Embodiment

Figure 11A:
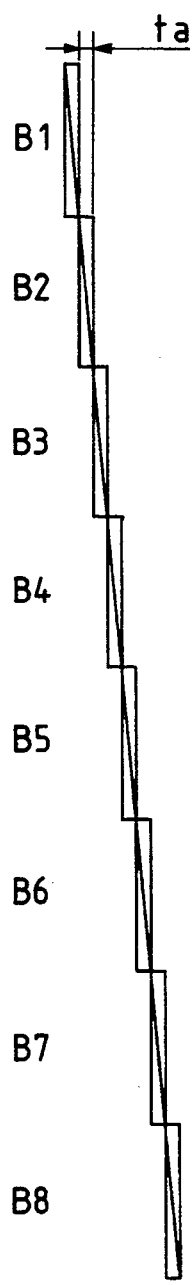
FIGS. 11A and 11B are views for explaining a print inclination of one line.
Figure 11B:
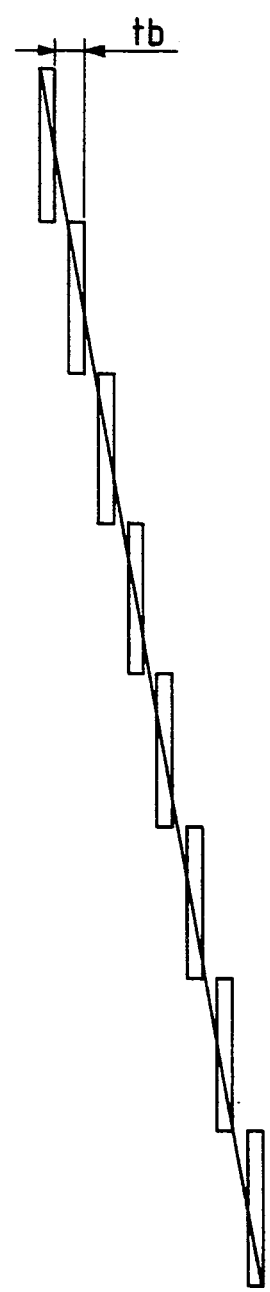

In an 8-split block driving mode, if the carriage scan speed varies, the interval between blocks also varies, and as a result, printed dots in one line are inclined. This state is shown in FIG. 11A. FIG. 11A shows a case of a normal carriage scan speed, and the block interval in this case is ta. In contrast to this, FIG. 11B shows a case of a ×2-speed carriage driving mode. In this case, the block interval is tb, and when the block intervals tb of blocks B1 to B8 are totaled, the print result is considerably inclined. This appears as an inclination of a ruled line when a vertical ruled line is printed.

Figure 12A:
FIGS. 12A and 12B are views showing print states according to the seventh embodiment.
Figure 12B:

In this embodiment, a recording head unit H is mounted on a carriage unit 2 in an inclined state. If the inclination of the print head in the normal speed print mode is set to be $\theta$, as shown in FIG. 12A, the inclination of the print head must be set to be $2\theta$ in the ×2-speed print mode, as shown in FIG. 12B, so as to obtain a print result equivalent to that obtained in the normal speed print mode. As described above, a proper head inclination angle varies in units of carriage scan speeds. Thus, the following countermeasures are proposed as embodiments.

(1) The print head inclination angle is set to be variable according to the carriage scan speed.

(2) The print head is inclined at an intermediate angle between those in the normal and ×2-speed scan modes.

(3) The head is inclined at an angle suitable for the ×2-speed print mode so as to improve image quality in the multi-pass print mode.

(1) When print head inclination angle is variable

The print head inclination angle changes according to the carriage scan speed, and an optimal head inclination angle can be obtained. The inclination angle of the head is adjusted manually or automatically using an actuator, and the like mounted on a carriage.

Figure 13:
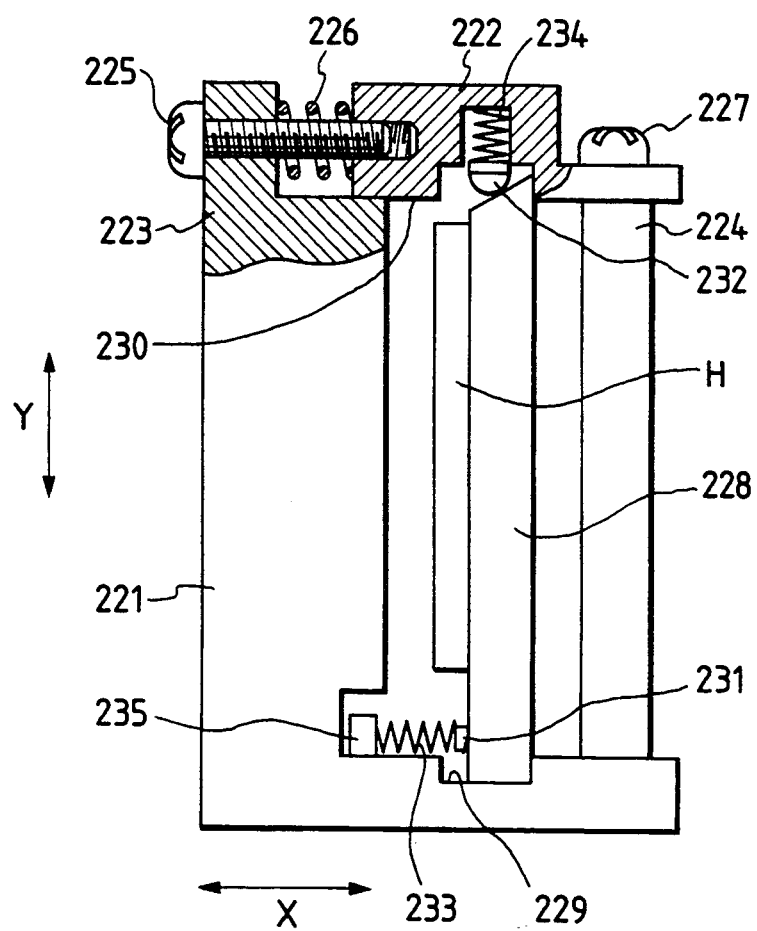
FIG. 13 is a view showing an arrangement for inclining a recording head.

FIG. 13 shows a carriage unit, which comprises a head inclination angle adjustment mechanism. In FIG. 13, the adjustment mechanism includes an L-shaped holder 221 fixed on the carriage, an inclination adjustment plate 222 slidably engaged with an L-shaped groove 223 formed in the head portion of the holder, a fixing plate 224, standing upright on the open end of the holder 221, for fixing the adjustment plate 222 in the horizontal direction (main scan direction), an inclination adjustment screw 225, screwed in the head portion of the holder 221, and joined to the end face of the adjustment plate 222, for adjusting the horizontal position of the adjustment plate 222, a spring 226, wound around the outer circumferential surface of the adjustment screw 225, and contacting the L-shaped groove 223 of the holder 221 and the end face of the adjustment plate 222, for biasing the adjustment plate 222 in a direction of the fixing plate 224, and a fixing screw 227, extending through an elongated groove (not shown) formed in an end portion of the adjustment plate 222 in the main scan direction, for fastening the adjustment plate 222 and the fixing plate 224.

The adjustment mechanism also includes a head board 228 for supporting the recording head unit H at an arbitrary small angle in the sub scan direction (in a direction of an arrow Y). The head board 228 is loosely fitted in a square groove 229 formed in the horizontal upper surface of the holder 221, and a square groove 230 opposing the groove 229, and formed in the lower surface of the adjustment plate 222, and is fixed while being biased in the horizontal and vertical directions by springs 233 and 234 through steel balls 231 and 232. In this case, one spring 233 biases the leg portion of the head board 228 in the horizontal direction to urge the board 228 against the one-side wall surfaces of the square grooves 229 and 230, and the other spring 234 biases the inclined head portion of the head board 228 in the vertical direction through the steel ball 232 to cause the board 28 to rest at the bottom portion of the square groove 229. Thus, the head board 228 is held at a predetermined position. The spring 233 is fixed to a stopper 235.

With this arrangement, the arrangement angle of the head in the paper feed direction can be arbitrarily adjusted by adjusting the adjustment screw 225.

More specifically, the adjustment plate 222 is horizontally movable when the fixing screw 227 is loosened, and the adjustment screw 225 is moved. In addition, the head boards 228 have the same length, and are juxtaposed at equal intervals. Thus, the adjustment plate 222, the head boards 228, and the holder 221 constitute a parallel crank mechanism as an angle varying means. Thus, the alignment direction of the nozzles on the recording head attached to the side surface of each head board 228 can be aligned at an arbitrary angle with respect to the feed direction of the recording medium.

(2) When intermediate angle is set

When three print modes, i.e., a normal scan mode, a ×2-speed print mode, and a ×4-speed print mode, are available, the head inclination angle for the ×2-speed print mode is set. No inclination adjustment mechanism is required, and the print inclinations of the three print modes can be coped with to some extent.

(3) When angle for multi-pass print mode is set

The head inclination angle is set for the multi-pass print (e.g., the ×2-speed print mode) in consideration of improvement of image quality, thus assuring improved image quality.

Eighth Embodiment

Figure 14:
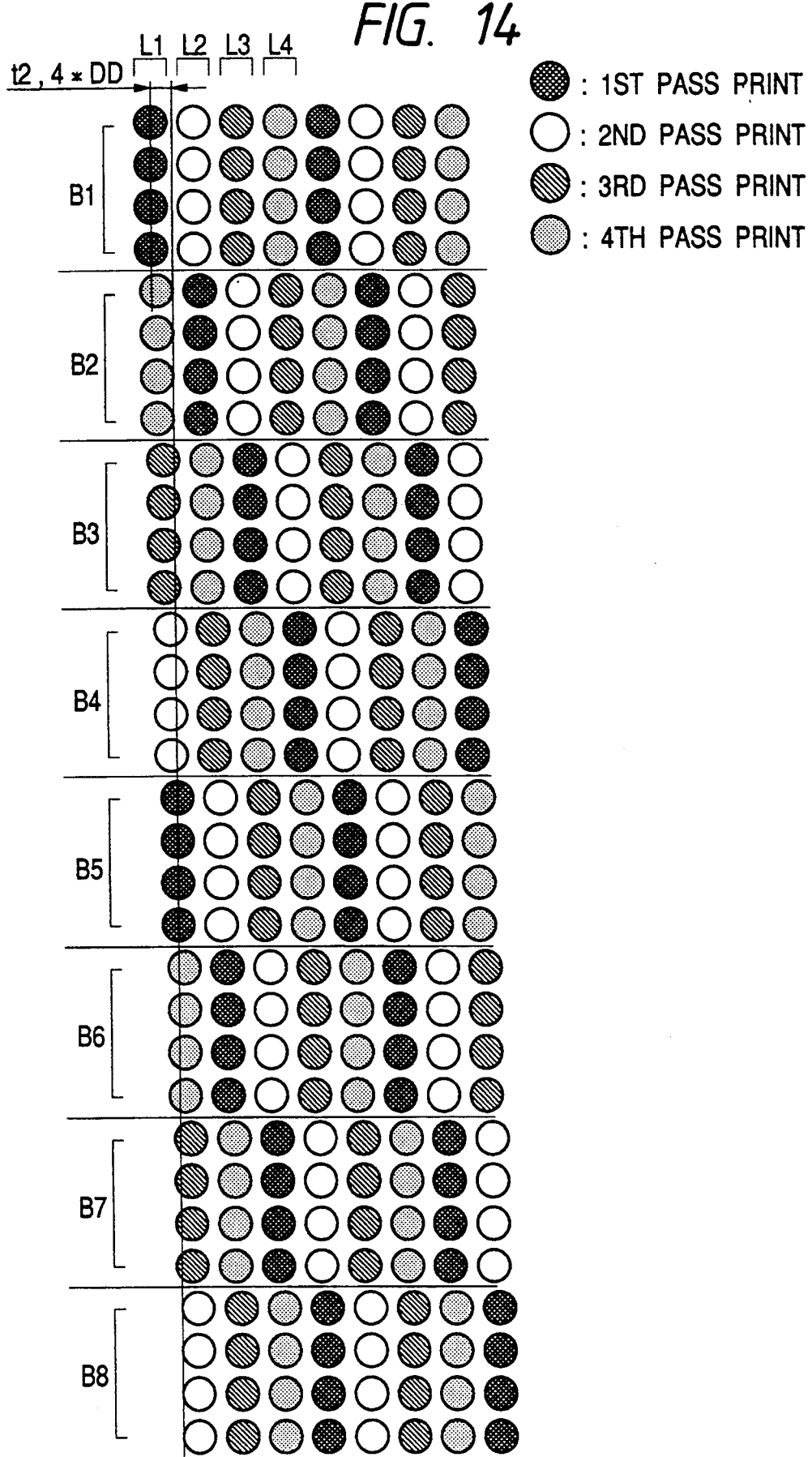
FIG. 14 is view showing a thinning driving pattern according to the eighth embodiment.

FIG. 14 shows the eighth embodiment. This embodiment exemplifies a 4-pass ×4-speed print operation in an 8-split block driving mode. When blocks B1, B5, B2, B6, B3, B7, B4, B8, and the like are sequentially driven in the first pass so that the block interval becomes four times that in the prior art, the carriage scan speed can become four times that in the prior art, thus improving the throughput (in the prior art, the block interval is DD; see FIG. 18).

Ninth Embodiment

Figure 15:
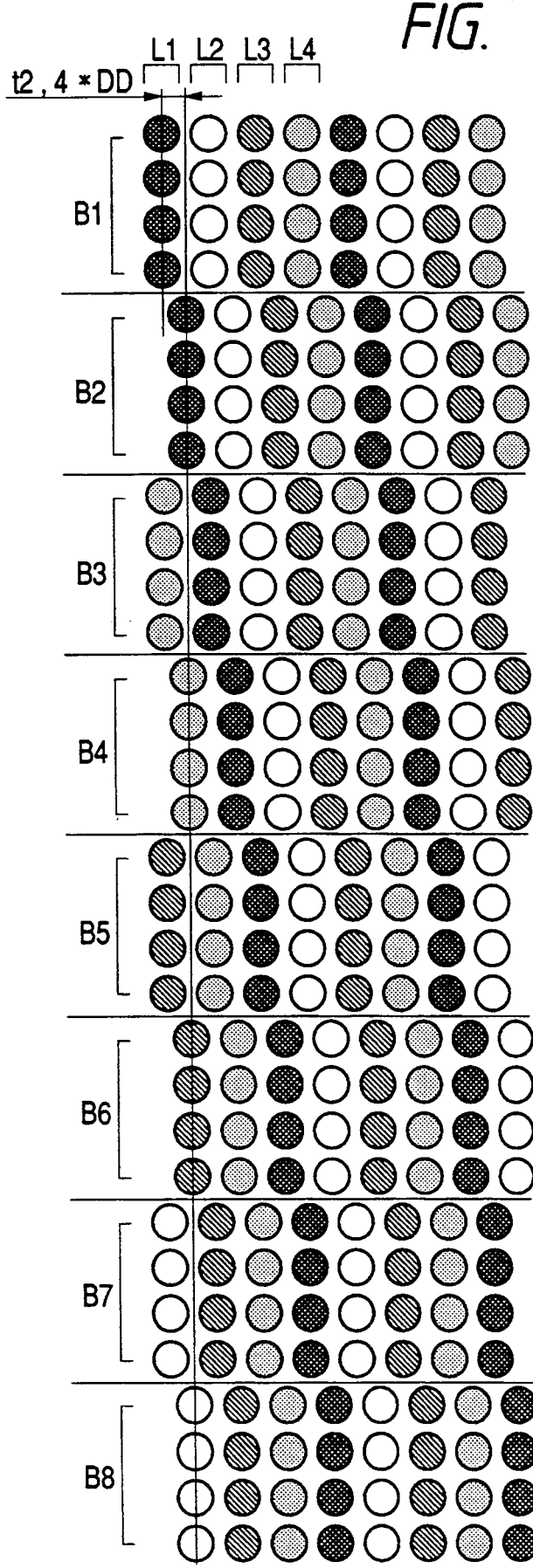
FIG. 15 is a view showing a driving pattern according to the ninth embodiment.
Figure 16:
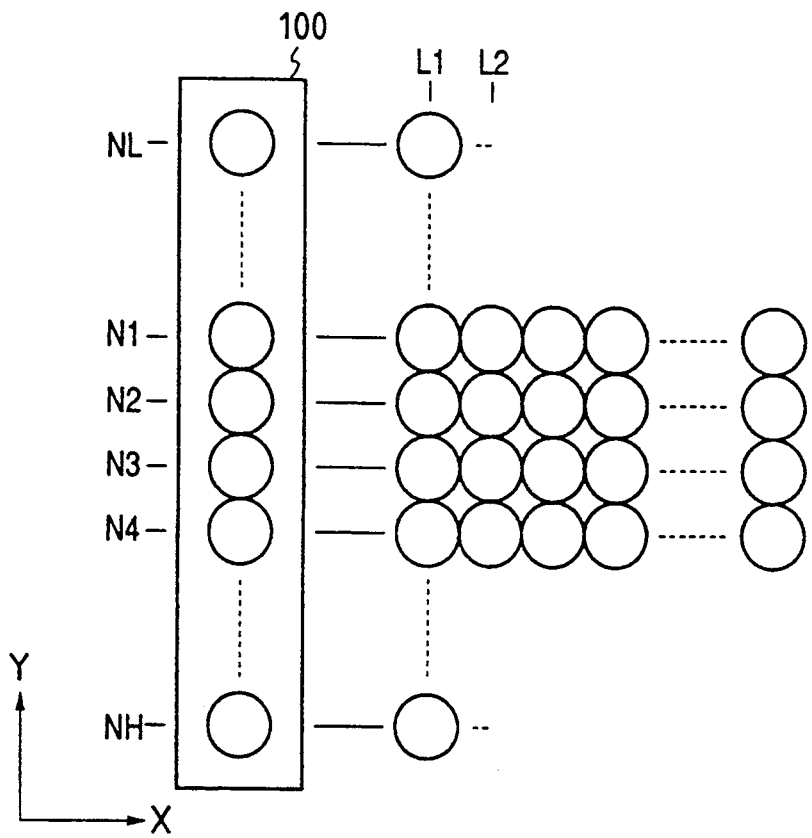
FIG. 16 is a view showing a conventional print pattern.

FIG. 15 shows the ninth embodiment. In this embodiment, the print inclination in the eighth embodiment is decreased. In the eighth embodiment, a maximum dot interval in one vertical line is 7DD (B1 to B8). This interval appears as a print inclination. Thus, in this embodiment, as shown in FIG. 15, the print start positions of odd-numbered blocks are aligned to suppress the maximum dot interval in one vertical line to 4DD.

Others

The present invention brings about excellent effects particularly in a recording head and a recording device of a system, which comprises means (e.g., an electrothermal converting element, laser light, and the like) for generating heat energy as energy utilized for execution of ink ejection, and causes a change in state of an ink by the heat energy, among the ink jet recording systems. According to this system, a high-density and high-definition recording operation can be attained.

As to its representative construction and principle, for example, those practiced by use of the basic principles disclosed in, for instance, U.S. Pat. Nos. 4,723,129 and 4,740,796 are preferred. The above system is applicable to either one of the so-called on-demand type and the continuous type. Particularly, the case of the on-demand type is effective because, by applying at least one driving signal which gives rapid temperature elevation exceeding, nucleate boiling corresponding to the recording information on electrothermal converting elements arranged in a range corresponding to the sheet or liquid channels holding liquid (ink), heat energy is generated by the electrothermal converting elements to effect film boiling on the heat acting surface of the recording head, and consequently the bubbles within the liquid (ink) can be formed in correspondence to the driving signals one by one. By ejecting the liquid (ink) through an ejection port by growth and shrinkage of the bubble, at least one droplet is formed. By making the driving signals into pulse shapes, growth and shrinkage of the bubble can be effected instantly and adequately to more preferably accomplish ejection of the liquid (ink) particularly excellent in response characteristics. As the driving signals of such pulse shapes, the signals as disclosed in U.S. Pat. Nos. 4,463,359 and 4,345,262 are suitable. Further excellent recording can be performed by using the conditions described in U.S. Pat. No. 4,313,124 of the invention concerning the temperature elevation rate of the above-mentioned heat acting surface.

As a construction of the recording head, in addition to the combined construction of an ejection orifice, a liquid channel, and an electrothermal converting element (linear liquid channel or right angle liquid channel) as disclosed in the above specifications, the construction by use of U.S. Pat. Nos. 4,558,333 and 4,459,600 disclosing the construction having the heat acting portion arranged in the flexed region is also included in the invention. The present invention can be also effectively constructed as disclosed in Japanese Laid-Open Patent Application No. 59-123670 which discloses the construction using a slit common to a plurality of electrothermal converting elements as an ejection portion of the electrothermal converting element or Japanese Laid-Open Patent Application No. 59-138461 which discloses the construction having the opening for absorbing a pressure wave of heat energy in correspondence with the ejection portion. More specifically, according to the present invention, recording can be reliably performed with high efficiency regardless of constructions of recording heads.

In addition, of the above serial type recording heads, the present invention is effective for a recording head fixed to an apparatus main body, a recording head of the freely exchangeable chip type which enables electrical connection to the apparatus main body or supply of ink from the apparatus main body by being mounted onto the apparatus main body, or a recording head of the cartridge type, which has an ink tank provided integrally on the recording head itself.

It is also preferable to add a restoration means for the recording head, preliminary auxiliary means, and the like provided as a construction of the recording apparatus of the invention because the effect of the present invention can be further stabilized. Specific examples of them may include, for the recording head, capping means, cleaning means, pressurization or aspiration means, and electrothermal converting elements or another heating element or preliminary heating means having a combination of them. It is also effective for stable recording to realize the preliminary ejection mode which executes ejection separately from recording.

The types and number of recording heads to be mounted are not particularly limited. For example, only one head may be arranged in correspondence with a monochrome ink, or a plurality of heads may be arranged in correspondence with a plurality of inks having different recording colors or densities. More specifically, as a recording mode of the recording apparatus, the invention is extremely effective for not only the recording mode of only a primary color such as black or the like but also an apparatus having at least one of a plurality of different colors or a full color by color mixing, depending on whether the recording head may be either integrally constructed or combined in plural number.

Moreover, in the embodiments of the present invention, an ink is described as a liquid. Alternatively, the present invention may employ an ink which is solidified at room temperature or less, and is softened or liquefied at room temperature, or an ink, which is liquefied upon application of a use recording signal since it is a general practice to perform temperature control of the ink itself within a range between 30° C. and 70° C. in an ink jet system so that the ink viscosity can fall within a stable ejection range. In addition, a temperature rise caused by heat energy may be prevented by positively utilizing the temperature rise as energy for a change in state from a solid state to a liquid state of the ink, or an ink which is solidified in a non-use state for the purpose of preventing evaporation of the ink may be used. In any case, the present invention can be applied to a case wherein an ink, which can be liquefied by heat energy such as an ink which is liquefied upon application of heat energy according to a recording signal, and is ejected in a liquid state, an ink which begins to be solidified when it reaches a recording medium, or the like may be used. In this case, an ink may be held in a liquid or solid state in recess portions or through holes of a porous sheet, as described in Japanese Laid-Open Patent Application No. 54-56847 or 60-71260, and the porous sheet may be arranged to oppose electrothermal converting elements. In the present invention, the above-mentioned film boiling system is most effective for the above-mentioned inks.

In addition, the ink jet recording apparatus of the present invention may be used as an image output terminal of an information processing equipment such as a computer, or a copying machine as a combination of the recording apparatus, a reader, and the like, or a facsimile apparatus having a transmission/reception function.

What is claimed is:

1. An ink jet recording apparatus for recording an image on a recording medium using recording means for recording comprising a plurality of recording elements, said apparatus comprising:

scan means for performing a scan operation by moving said recording means including said plurality of recording elements relative to said recording medium in a main scan direction;

driving means for driving said plurality of recording elements of said recording means in the scan operation by said scan means;

selection means for selecting one of a first recording mode for performing image recording by a first number of times of scan operations on a predetermined region of said recording medium, and a second recording mode for performing image recording by a second number of times of scan operations larger than the first number of times of scan operations on the predetermined region, wherein a scan speed of said scan means in the second recording mode is higher than a scan speed in the first recording mode; and control means for controlling said driving means so that in said second recording mode in each of the second number of times of scan operations, a recording of thinning image of mutually complementary dot arrangement is effected, wherein the dot arrangement is determined so that a recording density of the image, which is obtained by sequentially providing recordings of said thinning image in said mutually complementary dot arrangement in said second recording mode, is equal to a recording density of the image obtained in said first recording mode.

2. An apparatus according to claim 1, wherein the first recording mode is a mode for recording an image by performing a single scan operation on the predetermined region, and when the scan speed in the second recording mode is N times the scan speed in the first recording mode, said control means controls said driving means so as to drive said plurality of recording elements in a dot pattern in which a minimum dot distance in the scan direction in the second recording mode becomes not less than N times a minimum dot distance in the scan direction in the first recording mode.

3. An apparatus according to claim 2, wherein each of said plurality of recording elements causes a change in state in an ink by heat energy to eject the ink.

4. An apparatus according to claim 1 or 2, wherein said plurality of recording elements are segmented into a plurality of blocks, and said driving means drives said plurality of recording elements in units of blocks on a time division basis.

5. An apparatus according to claim 4, wherein each of said plurality of recording elements causes a change in state in an ink by heat energy to eject the ink.

6. An apparatus according to claim 4, wherein said driving means sequentially drives the recording elements in each of the blocks.

7. An apparatus according to claim 6, wherein a driving sequence of the recording elements in said each of the blocks is varied in respective scan operations.

8. An apparatus according to claim 7, wherein said driving means drives the recording elements in said each of the blocks so as not to align recording start positions with respect to the main scan direction by the recording elements in said each block in the respective scan operations.

9. An apparatus according to claim 7, wherein said driving means drives the recording elements in said each of the blocks so as to align recording start positions with respect to the main scan direction by the recording elements in said each block in the respective scan operations.

10. An apparatus according to claim 4, wherein said driving means simultaneously drives the recording elements within a same block.

11. An apparatus according to claim 10, further comprising moving means for relatively moving, after the scan operation, said recording means and the recording medium in a subscan direction different from the main scan direction.

12. An apparatus according to claim 11, wherein said driving means divides the plurality of recording elements of said recording means into a plurality of recording areas, a plurality of number of times of scan operations are performed for a specific area on the recording medium using the plurality of recording areas mutually different of said recording means, and in each of said scan operations said moving means performs a subscan for a width corresponding to the recording areas, thereby completing a recording for said specific area.

13. An apparatus according to claim 1 or 2, further comprising moving means for relatively moving, after the scan operation, said recording means and the recording medium in a subscan direction different from the main scan direction.

14. An apparatus according to claim 13, wherein said driving means divides the plurality of recording elements of said recording means into a plurality of recording areas, a plurality of number of times of scan operations are performed for a specific area on the recording medium using the plurality of recording areas mutually different of said recording means, and in each of said scan operations said moving means performs a subscan for a width corresponding to the recording areas, thereby completing a recording for the specific area.

15. An apparatus according to claim 1, wherein said control means controls said driving means so as to effect recording by driving said plurality of recording elements so that dots recorded in adjacent scan operations are not continuous with each other.

16. An apparatus according to claim 15, wherein each of said plurality of recording elements causes a change in state in an ink by heat energy to eject the ink.

17. An apparatus according to claim 1, further comprising means for varying an inclination of said recording means.

18. An apparatus according to claim 17, wherein each of said plurality of recording elements causes a change in state in an ink by heat energy to eject the ink.

19. An apparatus according to claim 1, wherein each of said plurality of recording elements causes a change in state in an ink by heat energy to eject the ink.

* * * * *